United States Patent
Rother et al.

(10) Patent No.: US 7,925,089 B2
(45) Date of Patent: Apr. 12, 2011

(54) OPTIMIZATION OF MULTI-LABEL PROBLEMS IN COMPUTER VISION

(75) Inventors: Carsten Rother, Cambridge (GB); Victor Lempitsky, Moscow (RU); Andrew Blake, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 11/857,075

(22) Filed: Sep. 18, 2007

(65) Prior Publication Data
US 2009/0074292 A1 Mar. 19, 2009

(51) Int. Cl.
*G06K 9/34* (2006.01)
(52) U.S. Cl. ....................................................... 382/180
(58) Field of Classification Search ................... None
See application file for complete search history.

(56) References Cited

U.S. PATENT DOCUMENTS

| | | | | |
|---|---|---|---|---|
| 5,293,430 | A * | 3/1994 | Shiau et al. | 382/173 |
| 6,507,661 | B1 | 1/2003 | Roy | |
| 6,744,923 | B1 * | 6/2004 | Zabih et al. | 382/226 |
| 6,973,212 | B2 * | 12/2005 | Boykov et al. | 382/173 |
| 7,587,086 | B2 * | 9/2009 | Shinkevich | 382/173 |
| 7,653,261 | B2 * | 1/2010 | Blake et al. | 382/284 |
| 7,660,463 | B2 * | 2/2010 | Blake et al. | 382/173 |
| 2005/0271273 | A1 * | 12/2005 | Blake et al. | 382/173 |
| 2006/0104542 | A1 | 5/2006 | Blake et al. | |
| 2006/0214932 | A1 | 9/2006 | Grady et al. | |
| 2006/0291721 | A1 * | 12/2006 | Torr et al. | 382/173 |
| 2007/0022067 | A1 | 1/2007 | Cremers et al. | |
| 2007/0031037 | A1 | 2/2007 | Blake et al. | |
| 2007/0285722 | A1 * | 12/2007 | Koyama | 358/1.18 |
| 2008/0123945 | A1 * | 5/2008 | Andrew et al. | 382/164 |

OTHER PUBLICATIONS

Boykov, et al., "Fast Approximate Energy Minimization via Graph Cuts", IEEE, vol. 23, No. 11, pp. 1222-1239.
Boykov, et al., "Markov Random Fields with Efficient Approximations", available at least as early as Jun. 26, 2007, at <<http://ieeexplore.ieee.org/iel4/5649/15135/00698673.pdf?isNumber=>>, pp. 8.
Freedman, et al., "Energy Minimization via Graph Cuts: Settling What is Possible", pp. 8.
Greig, et al., "Exact Maximum A Posteriori Estimation for Binary Images", J Royal Statistical Society, 1989, pp. 271-279.
Hammer, et al., "Roof Duality, Complementation and Persistency in Quadratic 0-1 Optimization", Mathematical Programming, 1984, pp. 121-155.
Hochbaum, "An Efficient Algorithm for Image Segmentation, Markov Random Fields and Related Problems", at <<http://delivery.acm.org/10.1145/510000/502093/p686-hochbaum.pdf?key1=502093&key2=3189382811&coll=GUIDE&dl=GUIDE&CFID=22335617&CFTOKEN=41199815 >>, ACM, vol. 48, No. 4, Jul. 2001, pp. 686-701.
Ishikawa, "Exact optimization for Markov random fields with convex priors", at <<http://www.nsc.nagoya-cu.ac.jp/~hi/MRF.pdf>>, IEEE, vol. 25, No. 10, Oct. 2003, pp. 1333-1336.

(Continued)

*Primary Examiner* — Yuzhen Ge
(74) *Attorney, Agent, or Firm* — Lee & Hayes, PLLC

(57) ABSTRACT

A method of labeling pixels in an image is described where the pixel label is selected from a set of three or more labels. The pixel labeling problem is reduced to a sequence of binary optimizations by representing the label value for each pixel as a binary word and then optimizing the value of each bit within the word, starting with the most significant bit. Data which has been learned from one or more training images is used in the optimization to provide information about the less significant bits within the word.

20 Claims, 6 Drawing Sheets

OTHER PUBLICATIONS

Kohli, et al., "Efficiently Solving Dynamic Markov Random Fields using Graph Cuts", available at least as early as Jun. 26, 2007, at <<http://cms.brookes.ac.uk/staff/PushmeetKohli/papers/pushmeet-dynamic.pdf>>, pp. 8.

Kolmogorov, et al., "What Energy Functions Can be Minimized via Graph Cuts?", IEEE, vol. 26, No. 2, Feb. 2004, pp. 147-159.

Nelder, et al., "Simplex Method for Function Minimization", The British Library, pp. 308-313.

Rother, et al., "Digital Tapestry", pp. 8.

* cited by examiner

OPTIMIZATION OF MULTI-LABEL PROBLEMS IN COMPUTER VISION

BACKGROUND

Many computer vision problems involve assigning a label to each pixel within an image. These labels may, for example, indicate whether the pixel is part of the background or foreground (e.g. for image segmentation). Depending on the application, the label may be selected from two possible labels (a binary label situation) or from a larger number of labels (a multi-label situation). In some applications the number of labels can be very large (tens or hundreds of labels).

A number of techniques have been developed and applied to computer vision problems, such as graph cut, tree-reweighted message passing (TRW), belief propagation (BP), iterated conditional modes (ICM) and simulated annealing (SA). Many of these techniques are applicable to both binary label problems and a multi-label problems, for example, graph cut may be extended by $\alpha$-expansion. However, $\alpha$-expansion does not scale well for large numbers of labels because it visits labels exhaustively and therefore the time taken is proportional to the number of possible labels. This linear dependency is also true for many other methods.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and apparatus for optimization of multi-label problems in computer vision are described. In an embodiment a method of labeling pixels in an image is described where the pixel label is selected from a set of three or more labels. The pixel labeling problem is reduced to a sequence of binary optimizations by representing the label value for each pixel as a binary word and then optimizing the value of each bit within the word, starting with the most significant bit. Data which has been learned from one or more training images is used in the optimization to provide information about the less significant bits within the word.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
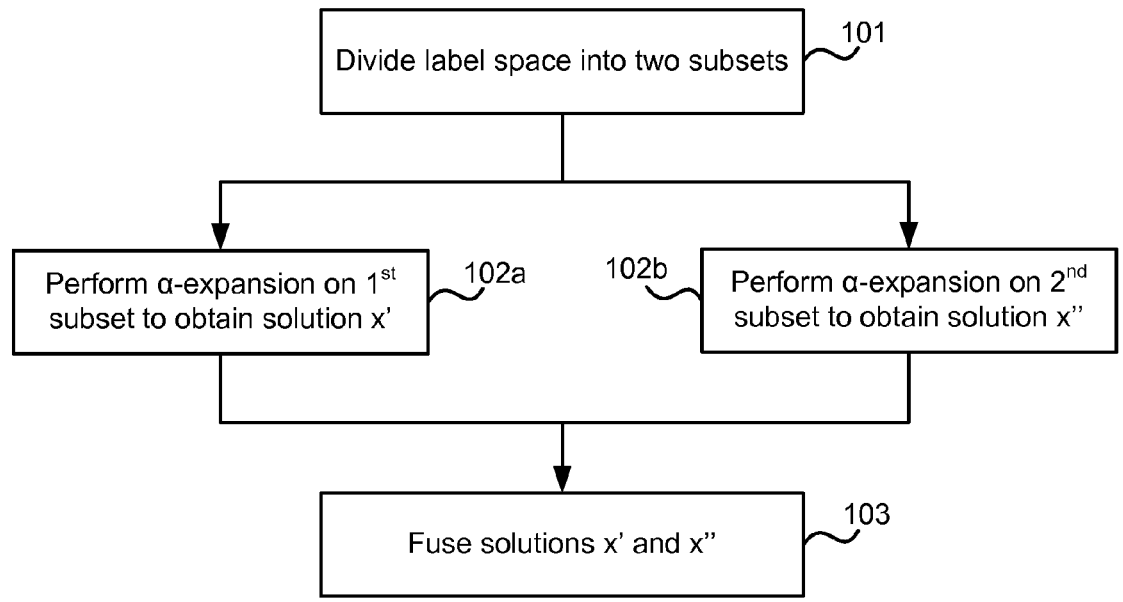
FIG. 1 is an example flow diagram of parallelized $\alpha$-expansion.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Most early vision problems can be formulated in terms of Markov random fields (MRFs) and therefore algorithms for MRF inference are very important for computer vision. The MAP-MRF approach (computing maximum a posteriori configurations in an MRF) has proven to be extremely successful for many vision applications such as stereo, image segmentation, image denoising, superresolution, new view synthesis and others. A special class of MRFs are binary MRFs.

The problem of minimizing an energy function of the following form can be considered:

$$E(x) = \sum_{m \in v} f_m(x_m) + \sum_{(m,n) \in \varepsilon} \gamma_{m,n} g_{m,n}(x_m, x_n) \qquad (1)$$

Here $G=(V,\varepsilon)$ is an undirected graph. The set of nodes V may correspond to pixels, and for a binary label space $x_m \in \{0, 1\}$ denotes the label of node m. If the function E is submodular, i.e. every pairwise term $g_{m,n}$ satisfies $$g(0,0)+g(1,1) \leq g(0,1)+g(1,0), \qquad (2)$$

then a global minimum of E can be computed in polynomial time as a minimum s–t cut in an appropriately constructed graph ("submodular graph cuts"). Note, there are many different energies, which include discrete labels, which can be converted into the form (1). Any energy with higher order terms i.e. where the summation over triples of variables is added to (1), can be transformed into form (1) as shown in the paper by V. Kolmogorov and R. Zabih entitled 'What Energy Functions can be Minimized via Graph Cuts?' and presented at ECCV '02 for the case of order 3 terms. The paper 'Energy Minimization via Graph Cuts: Settling what is Possible' by D. Freedman and P. Drineas and presented at CVPR 2005 shows how this may be done for order N terms. In many vision applications, however, the submodularity condition is not satisfied, i.e. the functions are general and may contain non-submodular and submodular terms, and minimizing such functions is a very challenging task (in general, NP-hard).

An approach for this problem has been proposed called roof duality and this is described in 'Roof duality, complementation and persistency in quadratic 0-1 optimization' by P. L. Hammer, P. Hansen, and B. Simeone, published in Mathematical Programming, 28:121-155, 1984. An algorithm for computing a roof dual is described in 'Network flows and minimization of quadratic pseudo-Boolean functions' by E. Boros, P. L. Hammer, and X. Sun, published as Technical Report RRR 17-1991, RUTCOR, May 1991. This algorithm can be viewed as a generalization of the standard graph cut algorithm and is referred to as the QPBO (quadratic pseudo-boolean optimization) algorithm.

In the more general case, where there are more than two labels, $x_m \in \{1, \ldots, K\}$, graph cut does not apply directly but may be extended by α-expansion. α-expansion considers the multi-label problem as a sequence of binary label decisions and requires iteration through each label at least once. Each iteration of α-expansion takes a suboptimal solution $x = (x_1, \ldots, x_N)$ and replaces it with an improved solution $x^*$ by either keeping the original label (i.e. the label in x) or replacing it with a fixed label α and this decision is made at each pixel location. For example, where there are three possible labels, 1, 2, or 3, the first iteration involves deciding for each pixel whether to retain the existing label or replace it with label 1. In the second iteration, the decision is made at each pixel whether to keep the existing label or replace it with label 2, etc. The optimization is $\min_y E(x)$ where $x_m = (1-y_m)x_m + y_m \alpha$. At each step, the value of E must decrease. By visiting all label values α in some sequence, and repeating the sequence, E is approximately optimized. In order for the α-expansion step to be solvable by graph cut, the binary optimization with respect to y must meet the submodularity requirement (as detailed above) or alternative methods (such as QPBO) must be used.

α-expansion may be generalized to combine two solutions to the optimization problem and this technique is referred to herein as the 'fusion move'. Suppose x' and x" are each trial solutions to the optimization problem. Then the fusion move is a binary optimization that fuses two solutions, giving the combined solution x that minimizes E(x) as before, but where now the auxiliary binary variables y are:

$$x_m = (1-y_m)x'_m + y_m x''_m, \quad (3)$$

switching between two solutions x' and x".

As shown in the example flow diagram of FIG. 1, one application of the fusion move is parallelized α-expansion in which each process (blocks 102a and 102b) deal with a subset of labels (as formed in block 101) and the results are then fused (block 103), i.e. by selecting, at each pixel location, either the label from solution x' or the label from solution x". As the fusion problem is generally non-submodular, QPBO is used for the binary optimizer (in block 103). Where QPBO returns unlabeled nodes, the labels of all unlabeled nodes from either of the two solutions x', x" may be set jointly either to y=1 or y=0, according to which gives lower energy. Due to the persistency property of the roof duality algorithm, this guarantees that the fused solution has the energy not exceeding the minimum of the energies of x' and x".

However, as described above, α-expansion does not scale well for large numbers of labels. α-expansion grows linearly with the size K of the label space because each label k must be visited once in each iteration. Methods are described below which deal with label space hierarchically by partitioning label-space successively according to values of binary bits $b=0, \ldots, B-1$ with $B = \log K$, starting with the most significant bit. This has the result that the labeling of a given pixel can be achieved by executing a tree of binary classification steps, which, in principle, achieves an increase in speed of order $K / \log K$.

Figure 2:
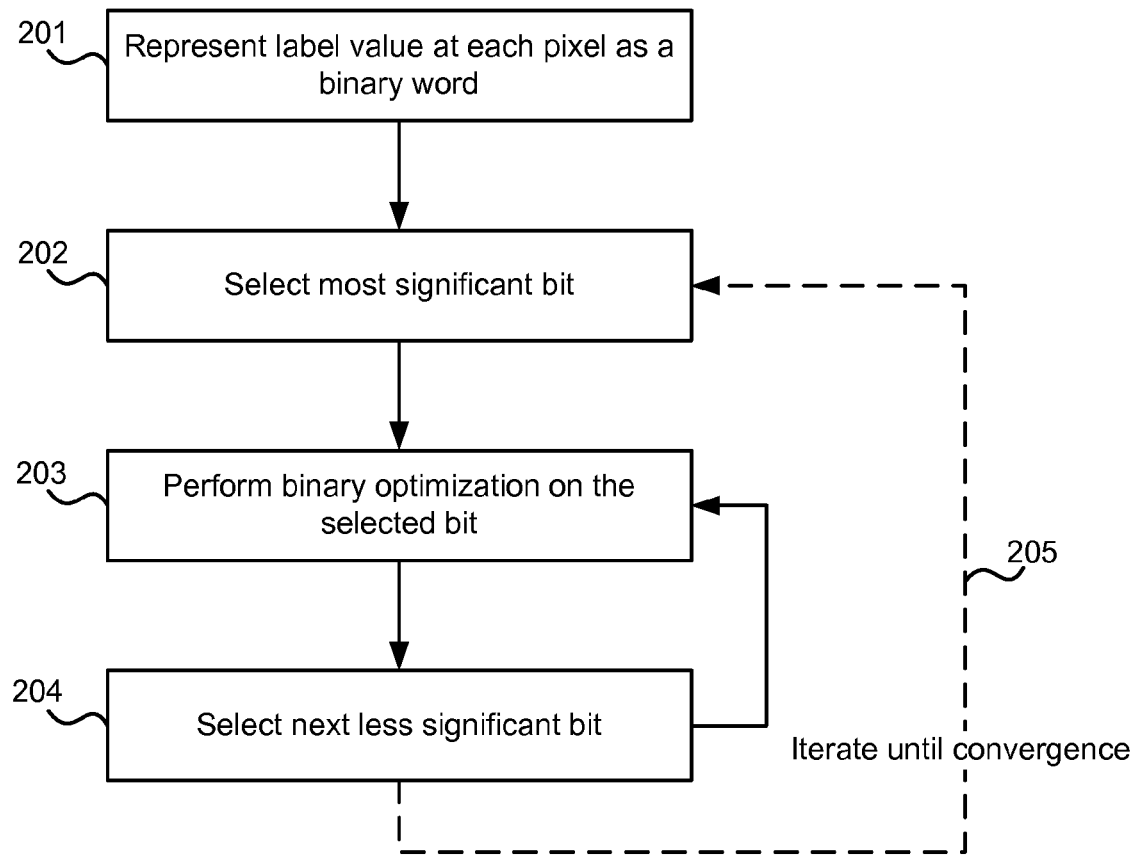
FIG. 2 shows an example flow diagram of a method of solving a multi-label problem.

FIG. 2 shows an example flow diagram of a method of solving the multi-label problem in which the integer value at each pixel m is represented as a B-bit word (block 201):

$$x_m = \sum_{b=0}^{B-1} x_m^b 2^b \quad (4)$$

This can be seen as a binary optimization problem with Nlog(K) variables, effectively an MRF with large cliques each of maximum size log(K). This would appear to be intractable to optimization by conventional methods. Therefore, retaining the original small-clique MRF structure, the optimization problem is to be solved by iterating over the bit-array:

$$x^b = (x_1^b, \ldots, x_m^b)$$

The process starts by selecting the most significant bit $b = B-1$ (block 202) and performing binary optimization on this bit (block 203) for all binary words (i.e. for all pixels). This may also be referred to as optimizing over bit level b. The process is then repeated for each of the bits in turn in order of decreasing significance (blocks 204 and 203), i.e. over each bit level, in order of decreasing significance. The binary optimization (in block 203) could, in principle, be performed using graph cut, however the submodularity condition must be satisfied (as described above). Alternatively the binary optimization may be performed using QPBO. Using the method shown in FIG. 2, instead of needing a number of iterations that grows linearly with N the number of levels, as for α-expansion, only a logarithmic number of steps is required. The method may be further iterated (as shown by dotted arrow 205) until convergence of the solution (i.e. until on repeating the method, the labeling of the solution is does not change).

In order to perform the binary optimization (in block 203) for a particular bit, it is necessary to set the values of all less significant bits as their values will affect the value of the energy function E. There are a number of ways in which the values of these less significant bits may be set, and these are described in more detail below.

In a first example, the values of all less significant bits may be set to zero and such a method may be referred to herein as 'Log Expansion' (LE). For example, where K=8, the integer value at each pixel may be represented by a 3-bit binary word (in block 201):

$$x_1, x_2, x_3$$

The most significant bit, $x_1$, is selected (in block 202) and in order to perform the binary optimization on this bit (in block 203), the values of the less significant bits, $x_2$, $x_3$, are set to zero. Having determined the value of $x_1$ for each pixel, the process is repeated (in block 204) to determine the value of $x_2$ (with the value of $x_3$ set to zero) and then to determine the value of $x_3$.

In a second example, a lower bound may be used, rather than setting the less significant bits to zero. In this case, when optimizing over a bit-level b (where more significant levels $b+1, \ldots, B-1$ have already been considered), an approximate energy $E^b$ is used, defined over the new bit variables:

$$E^b = \sum_{m \in V} f_m^b(x_m^{b:B-1}) + \gamma \sum_{(m,n) \in \varepsilon} g_{m,n}^b(x_m^{b:B-1}, x_n^{b:B-1}) \quad (5)$$

where $x_m^{b1:b2}$ denotes $(x_m^{b1}, \ldots, x_m^{b2})$, and $$f_m^b(x_m^{b:B-1}) = \min_{\substack{0:b-1 \\ x_m}} f_m(x_m) \text{ subject to } x_m^{b:B-1} \text{ fixed.} \quad (6)$$

Note that, in the case that the unaries are a known function, for example a quadratic of the form $(x-d)^2$ as in image restoration, the minimization (6) can be done in constant time, rather than time proportional to $2^b$. This reduces the formal complexity of this method from linear to logarithmic in label-set size. In practical settings, for general unaries, the (linear) time to evaluate (6) is in any case dominated by the logarithmic time for graph cut. Similarly, for the pairwise terms, $$g_{m,n}^b(x_m^{b:B-1}, x_n^{b:B-1}) = \min_{\{x_m^{0:b-1}, x_n^{0:b-1}\}} g_{m,n}^b(x_m, x_n) \quad (7)$$

subject to $x_m^{b:B-1}$, $x_m^{b:B-1}$ being fixed. It is straightforward to show that this is indeed a lower bound, that is:

$$\min_{x^{b:B-1}} E^b(x^{b:B-1}) \leq \min_x E(x) \quad (8)$$

As $\gamma \to 0$, approaching the trivial problem in which pairwise terms are switched off, the bound becomes exact. This is not the case for the earlier strategy of setting lower order bits to zero (referred to as LE). In a variation of this method, the min operation used in the definition can be replaced with other operations, for example a mean approximation constructed in this way.

Whilst in the above examples, the approximation for the less significant bits is calculated, in other examples, the approximation may be learned using one or more training MRF problems. In particular, the pairwise potential $g_{m,n}$ may be learned. In a first example involving learning, a least-squared approximation $g^b_{m,n}$ to $g_{m,n}$ may be constructed at each bit level. Taking $g_{m,n}$ to be a function of the difference $\Delta x_{m,n} = x_m - x_n$, gives the approximations $$g_{m,n}^b = \sum_{\Delta x^{b+1:B-1}} P(\Delta x^{0:b} | \Delta x^{b+1:B-1}) g_{m,n}(\Delta x_{m,n}) \quad (9)$$

The expectation is computed from training MRF problems for which the optimal solution x has been estimated by a "reference" method, taken here to be the best algorithm, TRW or α-expansion depending on energy model. Experimental results show that whilst this least-squared approximation performs better than the previous approximation methods described above (LE, min, mean), it is still not uniformly as good as α-expansion.

In a further example, the approximate pairwise potentials $g^b_{m,n}$ may be determined in a different manner. Given a set of pairwise potentials $G = \{g^b_{m,n}\}_{b=1...B}$, the sequential computation of bit levels on a training data-set, using these approximate pairwise potentials, produces a solution x(G). Training data, for image reconstruction for instance, typically consists of several training MRF problems, to avoid overlearning. It is natural to seek for the potential set G that results in the smallest training energy E(x(G)). In models used here, where $g_{m,n}$ is a truncated quadratic $\text{trunc}_\lambda$, the approximated, pairwise potentials can be represented in a similar parametric form:

$$g_{m,n}^b(\cdot) = \mu^b \text{trunc}_{\lambda^b}, 0 \leq \mu^b \leq 1, 0 \leq \lambda^b \leq \lambda \quad (10)$$

In that way, the set G of approximated potentials is defined by a vector with 2B elements: $G = \{\lambda_1, \mu_1, \lambda_2, \mu_2, \ldots, \lambda_B, \mu_B\}$. To optimize the training energy E(x(G)), we iterate over bit levels. While visiting bit level b the vector elements corresponding to all other bit levels are fixed and E(x(G)) is minimized with respect to $\mu_b$ and $\lambda_b$. The evaluation of E(x(G)) is done, as previously, by a single sweep of QPBO through the bit levels. For the 2D search over $(\mu_b, \lambda_b)$ exhaustive search is feasible, given the limited range of both variables, but the simplex method as described in 'A simplex method for function minimization' by J Nelder and R Mead (Computer Journal, 7:308-313, 1964, 5) is more efficient. Typically, the optimization process converges after 2-3 iterations over all bit levels. Initial values have to be chosen for G (for example from optimization using the "min" approximation above). In practice, it has been found that the value of $E_{train}(x(G))$ achieved after optimization is largely independent of those initial values.

Figure 3:
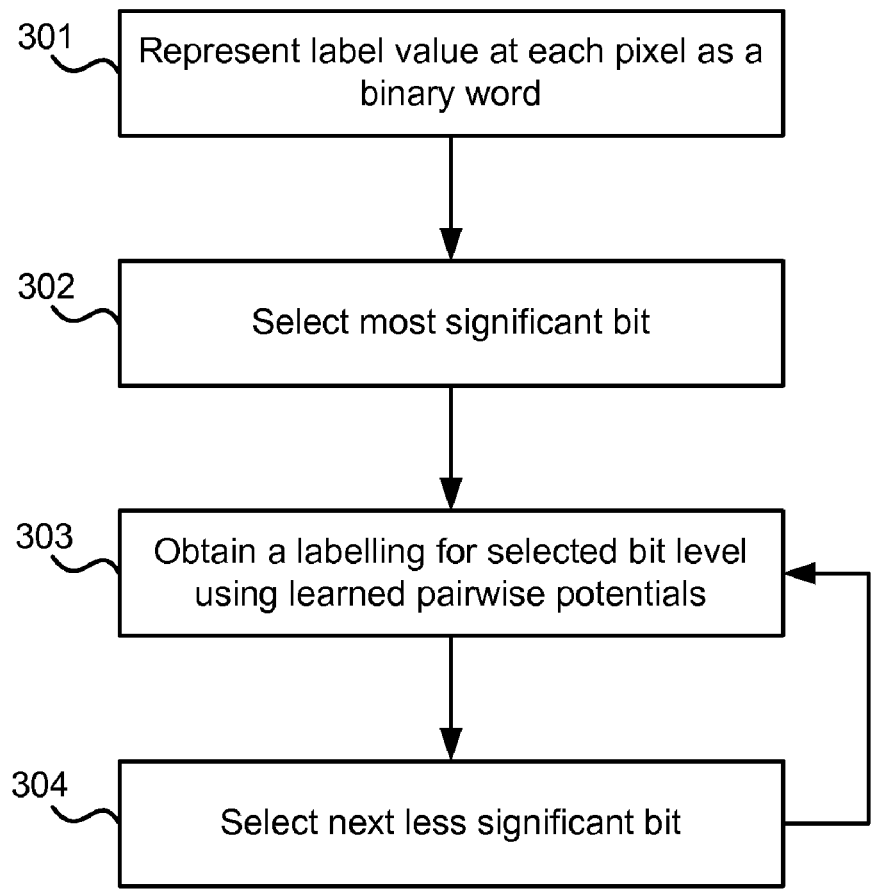
FIG. 3 shows a second example flow diagram of a method of solving a multi-label problem.

By using the learned approximate pairwise potentials in performing the binary optimization (in block 203 of FIG. 2), performance which is very close to one iteration of α-expansion can be achieved in much shorted computation time. This method is referred to herein as 'LogCut'. An example flow diagram of a trained LogCut sweep is shown in FIG. 3, in which the label value at each pixel is represented as a binary word (block 301), and then for each bit level in turn, starting from the most significant bit, a labeling for the selected bit level is obtained using learned pairwise potentials (blocks 302-304). The learned pairwise potentials are generated from a set of training MRF problems (not shown in FIG. 3). QPBO, truncated graph-cut or other method may be used to perform the binary optimization (in block 303, and also in block 203 of FIG. 2).

Figure 4:
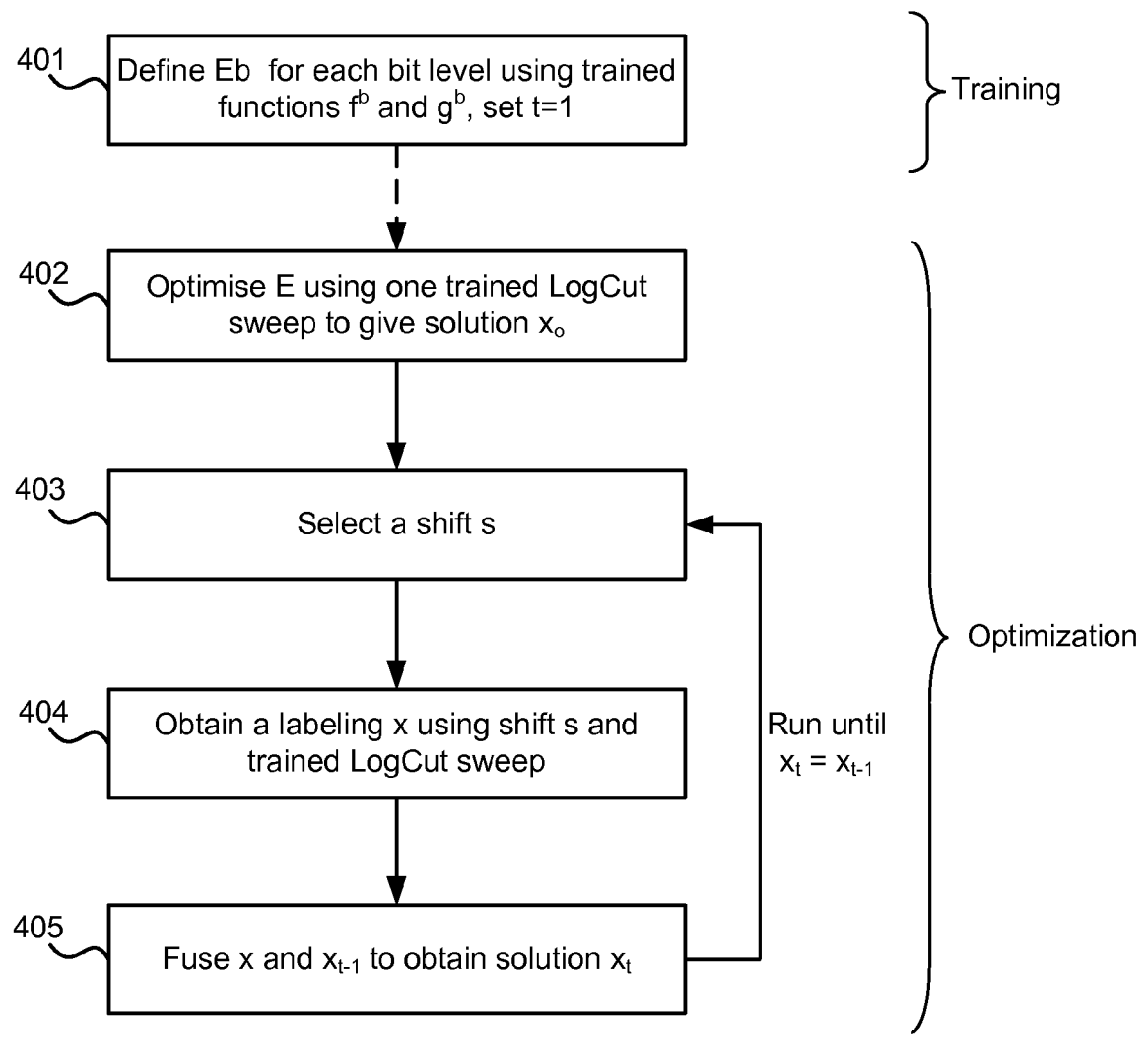
FIG. 4 shows an example flow diagram of the iterated LogCut algorithm.

In order to further optimize the energy, an iterative form of LogCut may be used which involves repeated sweeping. FIG. 4 shows an example flow diagram of the iterated LogCut algorithm. Training (block 401) is performed as described above to determine a trained function $g^b$. Function $f^b$ is approximated by lower bound (as described above) and these two functions $g^b$ and $f^b$ can be used define an approximate energy $E^b$ for each bit level, b (see (5)). An initial solution $x_0$ is obtained by applying a single LogCut sweep (block 402, e.g. as in FIG. 3). In each subsequent iteration (block 404), a shift s is introduced (selected in block 403) and applied to label values. The effect of this introduced shift s is that the binary coding (4) is applied to x+s (mod K) rather than to x. Each sweep of LogCut (in blocks 402 and 404) may be performed as shown in FIG. 3 and described above. The result of the single sweep in the shifted label space, x, (i.e. the output of block 404) is then fused with the previous solution, which initially will be $x_0$, to give a new solution with decreased energy (block 405). The process (blocks 403-405) may be repeated until convergence, i.e. until $x_t = x_{t-1}$.

The effectiveness of iterated LogCut depends on the particular choice of label shift s. The shift may be a constant value, may be randomly selected or may be selected according to an algorithm. Experimental results show that it is quite effective to select a shift s randomly but results with the following Maximum Regrouping strategy are a little more consistent. The regrouping distance between shifts is defined as:

$$r_b(s_1, s_2) = \frac{1}{2} - \left| \frac{|s_1 - s_2| \bmod 2^b}{2^b} - \frac{1}{2} \right| \quad (11)$$

which varies between 0 and ½. When $r_b(s_1, s_2) = 0$, $s_1$ and $s_2$ differ by a multiple of $2^b$, and the subdivision of labels at level b, for each of the two shifts, are identical. Conversely, the largest possible value $r_b(s_1, s_2) = ½$ implies that the corresponding groups of labels at level b are offset by half of the group size, giving maximal regrouping of labels. Total regrouping distance is naturally defined as a sum over bit levels:

$$r(s_1, s_2) = \sum_{b=1}^{B} r_b(s_1, s_2) \quad (12)$$

Now, at each iteration of LogCut, the shift that is the most distant from all previous shifts, according to (12), is chosen (in block 403). This encourages the maximum diversity amongst the solutions to be fused. These fused iterations prove effective in optimizing energy further than is possible with just a single iteration.

The following table shows a comparison of experimental results using LogCut compared to α-expansion, for a single iteration, in three different domains, stereo matching, image restoration and optic flow computation. For image restoration 10 training and 10 test images from the Corel database (approx. 240×160 gray scale images) were used which gives a label space of 8 bits. Gaussian noise was added to all images and portions of the image were obscured, creating areas where the unary is fixed to 0, and have therefore effectively to be inpainted. Either model 1:λ=200, γ=2000 or model 2: λ=4, γ=5000 were used.

For stereo matching, 9 registered datasets were used. To obtain good-looking results without intricate occlusion reasoning, a trinocular setup was used, where depth maps were recovered for middle images and the unaries were computed by taking minima of (sampling-insensitive, truncated SAD) matching costs with the left and the right images. For pairwise terms, λ=4 was used, which deals better with slanted surfaces than a pure Potts model. Edge-adaptive regularisation $\gamma_{m,n}$ was used in which if the color difference along an edge is large enough, $\gamma_{m,n}$=50, otherwise $\gamma_{m,n}$=150. The experiments were carried either at full resolution (image size=1390×1110, 8-bit label space) or at downsampled resolution (image size=458×356, 6-bit label space). In the former case, the sheer dataset size permits the use of only one training dataset (4 datasets were used for training at small resolution). Respectively, either 8 or 5 datasets were left for testing.

For the optical flow evaluation, a standard benchmarking Yosemite sequence (version with clouds was used). The motion vectors were discretized into 32×32 lattice (with ¼-pixel step). In the bit coding, the bits corresponding to the horizontal and the vertical components were interleaved. For unaries truncated SAD difference was used, while for pairwise terms 2D truncated quadratic potential g(v, v')=min $(((v_x-v'_x)^2+(v_y-v'_y)^2)/\lambda, 1)$ with λ=16 and edge-adapting $\gamma_{m,n}$=150/300 were used. A single frame pair from a completely different dataset (Berkeley "table tennis") was used for training.

| Problem | Bits | Speed-up 1$^{st}$ iter | Energy diff 1$^{st}$ iter | Energy diff converg. |
|---|---|---|---|---|
| Low-res stereo | 6 | 4.9 (1.6) | +2.6% | −0.3% |
| High-res stereo | 8 | 9 (2.2) | +3.6% | −0.2% |
| Image res, model 1 | 8 | 12.4 (6.1) | +0.5% | −2.6% |
| Image res, model 2 | 8 | 11 (—) | +4.4% | +0.3% |
| Optical flow | 10 | 20.7 (10.3) | +2.5% | −2.4% |

The speed up is given as the ratio of computation times for α-expansion vs. LogCut, for one iteration. The figure in brackets is the time ratio based on running LogCut until its energy matches that after one iteration of α-expansion. Energy differences (LogCut minus α-expansion) are shown after one iteration and at convergence. It is clear that the speed advantage of LogCut increases with the number of bits used for label-space.

Figure 5:
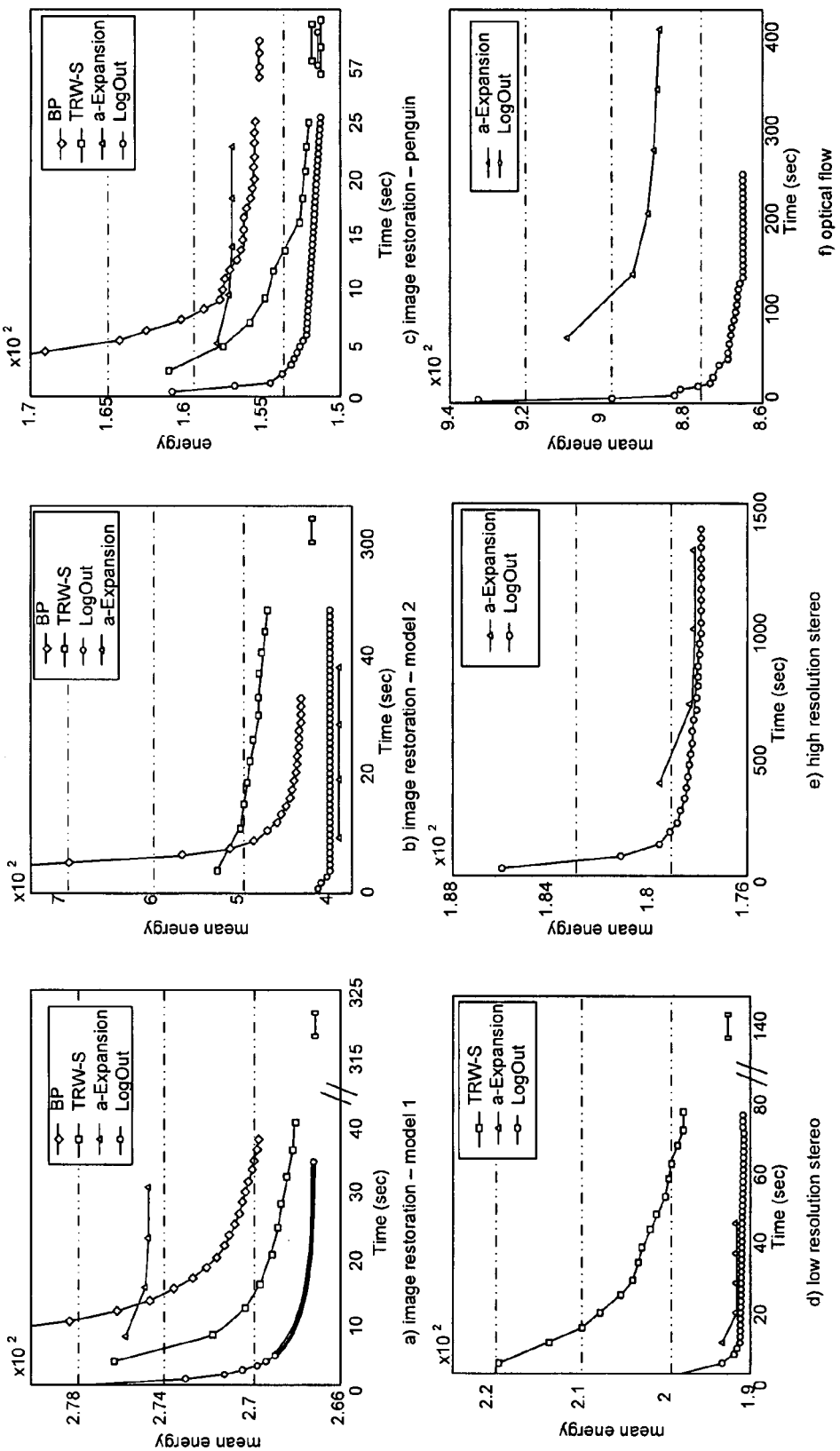
FIG. 5 shows time-energy plots for LogCut in comparison to other techniques.

The comparison is also shown in FIG. 5 which shows six time-energy plots, with each marker on the curves representing one iteration of optimization. These plots show that LogCut outperforms the other techniques when terminated early, requiring substantially less computation time to achieve equivalent energy. For stereo and optical flow, LogCut also outperforms the other techniques in energy achieved at convergence.

Whilst the requirement for training in LogCut introduces an additional burden, the benefits outweigh this significantly. Experimental results have shown that often just a single training image is sufficient and in experiments relating to image restoration, in the extreme case of taking just one single training image, the highest energy on the test set (after one iteration) was only 1.5% higher than training on all training images. Secondly training data does need not be especially similar to test data, so one set of trained potentials should suffice for a wide range of test data.

Whilst the shift technique is described above in combination with use of learned pairwise potentials, this is by way of example only. The shift technique is more broadly applicable and may be used in other applications where learned pairwise potentials are not used.

Figure 6:
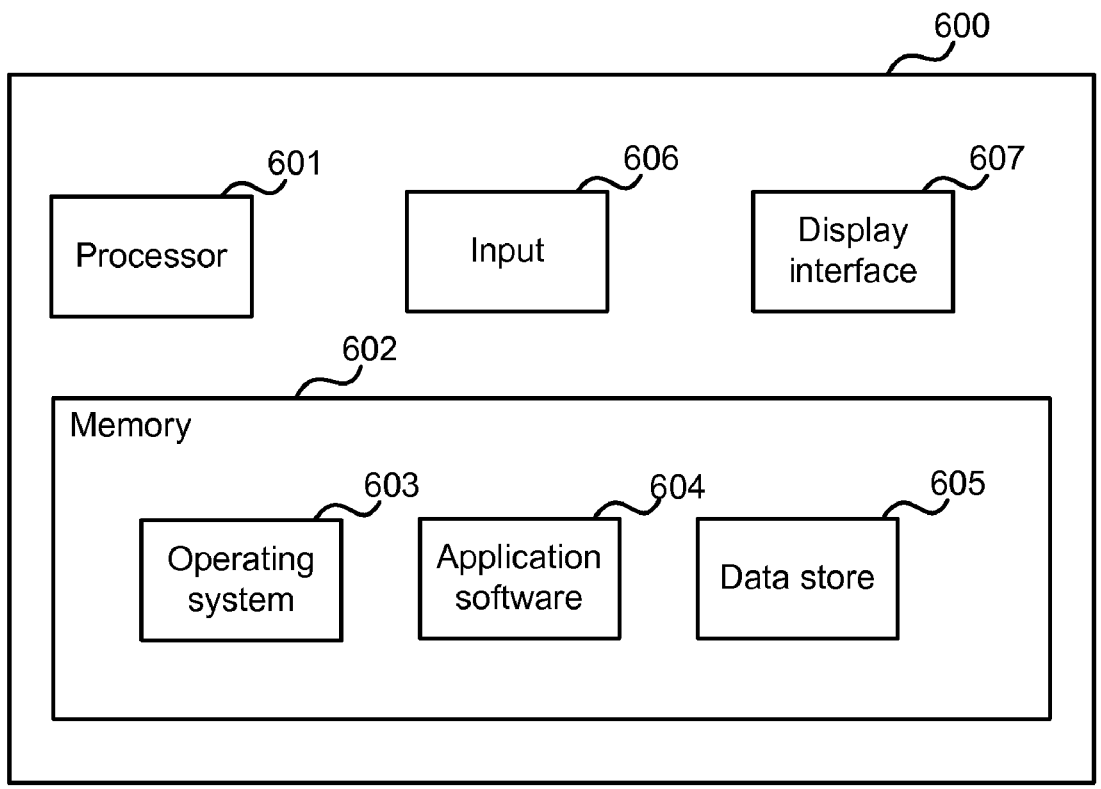
FIG. 6 illustrates an exemplary computing-based device in which embodiments of the methods of FIGS. 1-4 may be implemented.

FIG. 6 illustrates various components of an exemplary computing-based device 600 which may be implemented as any form of a computing and/or electronic device, and in which embodiments of the methods described above may be implemented. Such a device may be referred to as an image processing system although the system may be capable of other functions and applications.

Computing-based device 600 comprises one or more processors 601 which may be microprocessors, controllers or any other suitable type of processors for processing computing executable instructions to control the operation of the device in order to perform any aspects of the pixel labeling methods described above. Computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system 603 or any other suitable platform software may be provided at the computing-based device to enable application software 604 to be executed on the device. The operating system and application software may be stored in the memory 602. The memory may also comprise a data store 605 for storing labeled images.

The computing-based device 600 may further comprise one or more inputs and outputs. An input may be of any suitable type for receiving media content, Internet Protocol (IP) input etc. In an example an input 606 may be provided to receive the image data. An output may comprise an audio and/or video output to a display system integral with or in communication with the computing-based device, such as display interface 607. The display system may provide a graphical user interface or other user interface of any suitable type, although this is not essential. The device may also comprise a communication interface (not shown in FIG. 6).

Although the present examples are described and illustrated herein as being implemented in a computing system as shown in FIG. 6, the system described is provided as an example and not a limitation. As those skilled in the art will appreciate, the present examples are suitable for application in a variety of different types of computing systems/devices.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of labeling pixels in an image for image segmentation, wherein each label is selected from a set comprising at least three labels, the method comprising:
   representing a label value at each pixel as a binary word, wherein each binary word comprises a plurality of bits arranged in order of significance;
   determining, using a computer, a value of a most significant bit for each pixel in the image using a binary optimizer and learned data; and
   repeating the determination for each bit for each pixel in order of decreasing significance to obtain a solution comprising a label for each pixel in the image.

2. A method according to claim 1, wherein the learned data comprises learned approximate pairwise potentials for any less significant bits in each word.

3. A method according to claim 2, wherein each learned approximate pairwise potential comprises a least-squared error approximation of a pairwise potential at each bit level.

4. A method according to claim 2, wherein each learned approximate pairwise potential is represented in parametric form.

5. A method according to claim 1, wherein the binary optimizer comprises QPBO.

6. A method according to claim 1, further comprising repeating the method until convergence.

7. A method according to claim 1, further comprising:
   storing a labeled version of the image, the labeled version comprising pixels assigned labels according to the solution.

8. A method according to claim 7, further comprising:
   displaying the labeled version of the image in a user interface of an image processing application.

9. A method according to claim 1, further comprising:
   selecting a shift parameter;
   representing the sum of the label value at each pixel and the shift parameter as a binary word;
   determining a value of a most significant bit for each pixel in the image using the binary optimizer and the learned data;
   repeating the determination for each bit for each pixel in order of decreasing significance to obtain a second solution comprising a label for each pixel in the image; and
   fusing the solution and the second solution to create a new solution.

10. A method according to claim 9, further comprising:
    repeating the selection of a shift parameter and the representing, determining, repeating and fusing steps until convergence.

11. A method according to claim 9, wherein the shift parameter is selected substantially randomly.

12. A method according to claim 10, wherein the shift parameter is selected to maximize a regrouping parameter, r, defined as:

$$r = \sum_{b=1}^{B} \frac{1}{2} - \left| \frac{|s_1 - s_2| \bmod 2^b}{2^b} - \frac{1}{2} \right|$$

where b is a bit level and $s_1$ and $s_2$ are two sequentially selected values of the shift parameter.

13. A computer readable memory storing information to enable a computing device to perform a process, the computing device comprising a processor and a memory, the process comprising:

representing a label value at each pixel in an image as a binary word, wherein each binary word comprises a plurality of bits arranged in order of significance;

determining a value of a most significant bit for each pixel in the image using a binary optimizer and learned data; and repeating the determination for each bit for each pixel in order of decreasing significance to obtain a solution comprising a label for each pixel in the image.

14. A computer readable medium according to claim 13, wherein the process further comprises:

storing a labeled version of the image, the labeled version comprising pixels assigned labels according to the solution.

15. A computer readable medium according to claim 14, wherein the process further comprises:

displaying the labeled version of the image in a user interface of an image processing application.

16. A method of labeling each pixel in an image for image segmentation with one of a set of at least three labels, the method comprising:

representing labels associated with each of the pixels in the image as binary words, each word comprising a plurality of bits arranged in order of decreasing significance;

selecting a first bit level, comprising a most significant bit from each of the binary words and calculating, using a computer, the value of each of the bits in the first bit level using binary optimization and learned data relating to less significant bits in each word;

selecting a next bit level, comprising a next most significant bit from each of the binary words and calculating the value of each of the bits in the selected next bit level using binary optimization and learned data relating to less significant bits in each word; and repeating the selection of a next bit level and the calculation of values of bits in the selected next bit level until the values of all bits in all binary words have been calculated to produce a fully labeled image.

17. A method according to claim 16, wherein the learned data relating to less significant bits in each word comprises:

learned approximate pairwise potentials for any less significant bits in each word.

18. A method according to claim 16, wherein the binary optimization uses QPBO.

19. A method according to claim 16, further comprising:

storing the fully labeled image, the fully labeled image comprising pixels assigned labels according to the values of bits in the binary words.

20. A method according to claim 16, further comprising:

displaying the fully labeled image in a user interface of an image processing application.

\* \* \* \* \*